(No Model.)

A. VIVARTTAS.
TOOL FOR CUTTING THE TEETH OF METAL GEAR WHEELS.

No. 274,860. Patented Mar. 27, 1883.

Witnesses:
Edward Hughes
Augustus Böttger

Inventor.
Aloha Vivarttas

UNITED STATES PATENT OFFICE.

ALOHA VIVARTTAS, OF WEST HOBOKEN, NEW JERSEY.

TOOL FOR CUTTING THE TEETH OF METAL GEAR-WHEELS.

SPECIFICATION forming part of Letters Patent No. 274,860, dated March 27, 1883.

Application filed August 19, 1882. (No model.)

*To all whom it may concern:*

Be it known that I, ALOHA VIVARTTAS, of West Hoboken, New Jersey, have invented Improvements in the Manufacture of the Teeth of Gear-Wheels, of which the following is a specification.

Figure 1:
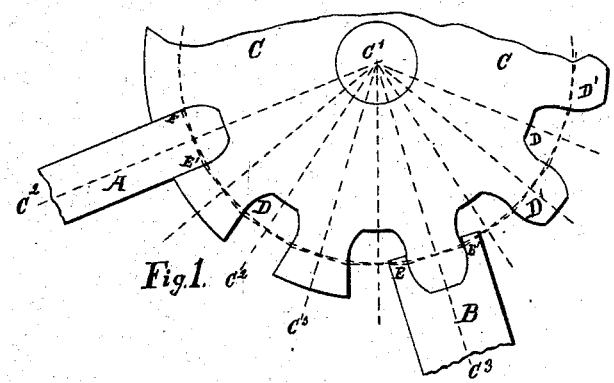
Figure 2:
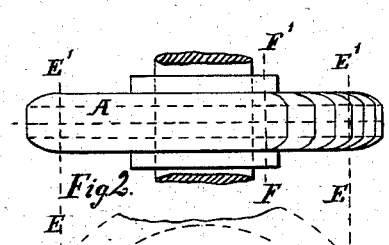
Figure 3:
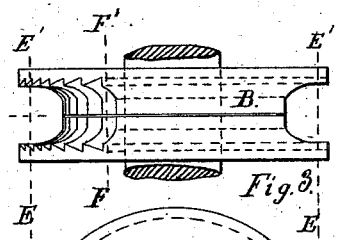
Figure 4:
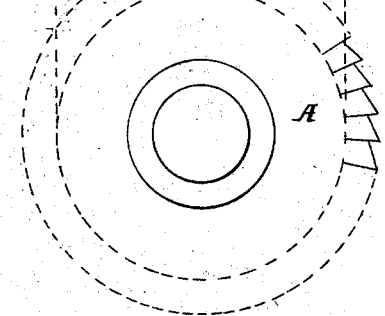
Figure 5:
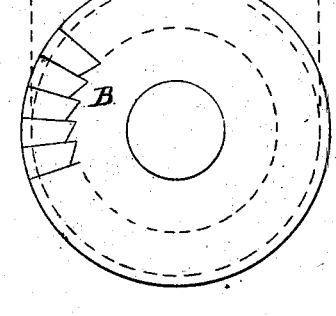

Of the drawings, Figure 1 is a plan view of a part of a disk that is being cut, showing the action of the male and female cutters. Fig. 2 is a side and edge view of a male cutter of the rotary description. Fig. 3 is a side and edge view of a female cutter of the rotary description. Fig. 4 is a side and plan view of a male cutter or templet. Fig. 5 is a side and plan view of a female cutter or templet.

The same letters refer to the same parts throughout.

This invention relates to the form and construction of rotating cutters or mills, single-edge tools—as planing or turning tools and templets or patterns—and also to the method of using the same in finishing gear-wheels, whether spur, bevel, or spiral, and whether screw threads or racks. In forming the teeth and spaces between them on a gear-wheel it is customary to use a cutter which, being driven toward the center of the gear upon the center line of the space between two teeth, forms both flanks of that space, and also one side of each of the two adjacent teeth, at one operation. By this method a cutter fitted to make a perfect tooth on a gear-wheel of any one size or number of teeth can cut no other number perfect, and even the tolerable approximations attainable with one cutter are so limited in number that a full set of cutters for any one pitch becomes a necessary and expensive item, and at the best makes an inferior article, to say nothing of the make-shifts, where, from motives of economy of money or time, gear-teeth are cut with cutters never intended for any such size. To correct such evils the cutter and manner of using it herein described are used.

By the term "space" in this specification is meant the opening from the pitch-line in, whose sides determine the form of the bases of the adjacent teeth; and by the term "tooth" is meant the body of the tooth from the pitch-line out.

For any one pitch or size of tooth two cutters are provided—a male or space cutter, A, and a female or tooth cutter, B. In using these the male A is passed through the blank in the usual way on the center line of the space between two teeth, or on radius C' C², finishing the space only, as shown at D. Then the female B is passed over the tooth proper upon the center line or radius thereof, C' C³, finishing both sides or flanks of the same tooth at one cut down to the pitch-line, meeting the finished surface made by the male cutter, and leaving perfect space D and perfect tooth D', and this pair of cutters will cut any size of gear or number of teeth from the straight rack or wheel of infinite radius to the smallest pinion, leaving all equally perfect and accurate in all of their proportions. This style of cutter can be made of any preferred form or contour of tooth, however constructed. These cutters are adapted to all styles and sizes of gear, from watch-wheels to machine or wooden pattern work for gear of the largest size. In making these cutters it is advisable but not essential that the male, Fig. 2, A, and female, Fig. 3, B, should have their diameters at the point E E', where they coincide with the pitch-line of the gear they cut, equal. This facilitates their use. Thus the male cutter A having been put on the arbor and adjusted so that it just agrees with the diameter of the wheel, which is when the line E E' is a true tangent to the pitch-circle of the wheel and the spaces cut around, the cutters are shifted without altering the adjustment for center distance, the female cutter B finishing the gear without further adjustment. For a similar reason, the male cutter A being made of dimensions on the line F F' equal to the female cutter B on the same line, F F', if the cutter A has been properly adjusted upon the line of centers the cutter B shifts into the same position without trouble. The gear being now shifted from space to tooth, no further adjustment is required. The female cutter B is generally made double, or in two parts, as shown, both for convenience of making it, and also that the halves may be used separately in cutting bevel-gear and others. In cutting worms the straight cutters or lathe-tools, Figs. 4 and 5, are generally used. Sometimes these tools have two or more points for the more perfect finishing of double and triple threaded worms. The worm-gear should be finished by a cutter made in duplicate of the worm itself. In pattern-making for cast gear the workman uses a male templet, like A, Fig. 4, for proving his work in finishing the spaces between the teeth and within the pitch-line, and then a female templet, like B, Fig. 5, in finishing the teeth from pitch-line out, the manner of applying these templets being shown in Fig. 1, A and B. These two templets will fit any pattern he can make of their pitch, and, while making better running and fitting gear than are possible by the old methods of laying out, are also far less troublesome to make.

In the drawing-room the habitual use of these templets in depicting the required gear-wheels not only saves much time in drawing the teeth, but also accustoms the eye of the workman to the correct proportions required at his hand, conducing to improved workmanship.

Having thus described the nature and uses of my invention, that which I claim, and desire to secure by Letters Patent, is—

1. The combination of the male and female cutters whose combined cuts form a perfect finished tooth on any wheel or rack of the same pitch, as described, when constructed and operating in the manner and for the purpose as above set forth.

2. The combination of the male and female cutters, the former adapted to cut on the radial center line of the space and give form to its sides up to the pitch-line of the gear, and the latter adapted to work on the radial center line of a tooth and finish the form of both sides of the tooth down to the pitch-line, substantially as and for the purposes described.

3. The female cutter or templet B, made in two parts, as and for the purposes herein shown and described.

ALOHA VIVARTTAS.

Witnesses:
 EDWARD HUGHES,
 AUGUSTUS BOTTGER.